United States Patent [19]

Horiguchi et al.

[11] Patent Number: 5,761,185
[45] Date of Patent: Jun. 2, 1998

[54] APPARATUS FOR READING AND WRITING READ/WRITE DISKS

[75] Inventors: Hideo Horiguchi, Gyoda; Hiroshi Kimura, Minamisaitama-gun, both of Japan

[73] Assignee: Shinwa Kabushiki Kaisha, Tokyo, Japan

[21] Appl. No.: 805,784

[22] Filed: Feb. 25, 1997

[51] Int. Cl.$^6$ ............................................. G11B 17/028
[52] U.S. Cl. ........................... 369/270; 360/99.12
[58] Field of Search ............................ 369/270, 271, 369/282, 34, 36, 38; 360/98.08, 99.05, 99.12

[56] References Cited

U.S. PATENT DOCUMENTS

| | | | |
|---|---|---|---|
| 2,308,880 | 1/1943 | Hokanson | 369/34 |
| 2,960,340 | 11/1960 | Seidel et al. | 369/34 |
| 3,236,525 | 2/1966 | Moody | 369/34 |
| 4,390,979 | 6/1983 | Saito et al. | 369/270 |
| 4,649,531 | 3/1987 | Horowitz et al. | 369/270 |
| 4,730,300 | 3/1988 | Kamoshita et al. | 369/270 |
| 4,791,624 | 12/1988 | Stinesen | 369/270 |
| 4,998,618 | 3/1991 | Borgions | 369/38 |
| 5,099,466 | 3/1992 | Kimura et al. | 369/36 |
| 5,136,563 | 8/1992 | Takemasa et al. | 369/36 |
| 5,166,920 | 11/1992 | Kogure | 360/99.12 |
| 5,177,731 | 1/1993 | Tanaka et al. | 369/77.1 |
| 5,450,260 | 9/1995 | Sakaguchi et al. | 360/99.08 |
| 5,481,512 | 1/1996 | Morioka et al. | 369/36 |
| 5,555,233 | 9/1996 | Yano et al. | 369/270 |
| 5,631,894 | 5/1997 | Takahashi | 369/270 |
| 5,682,364 | 10/1997 | Ogawa | 369/36 |

FOREIGN PATENT DOCUMENTS

| | | |
|---|---|---|
| 61-61262 | 3/1986 | Japan. |
| 2-143942 | 1/1990 | Japan. |
| 3-235248 | 10/1991 | Japan. |
| 4-061080 | 2/1992 | Japan. |

*Primary Examiner*—Stuart S. Levy
*Assistant Examiner*—David L. Ometz
*Attorney, Agent, or Firm*—Joseph C. Mason, Jr.

[57] ABSTRACT

A read/write apparatus which enables setting and removal of a read/write compact disk within a limited space of the apparatus includes a turntable 83 having a cap portion 123 that permits a center hole h of a read/write compact disk to be fitted therearound. Clips 124 are capable of advancing and retreating from a rim of cap portion 123 of turntable 83. A setting/removing lever 136 is provided in such a manner that setting/removing lever 136 is capable of rotating by a specified angle with respect to turntable 83. A head 85 which is capable of moving parallel to the radius of the read/write compact disk to perform reading or writing of the read/write compact disk is provided. Head 85 has a stopper 145 which catches a catching portion 139 of setting/removing lever 136 at a position head 85 approaches closest to turntable 83. Cap portion 123 is provided with a setting/removing device 125. During forward rotation of turntable 83, setting/removing device 125 catches stopper 145, thereby causing clips 124 to advance. During reverse rotation of turn table 83, setting/removing device 125 catches stopper 145 and which enables clips 124 to retreat.

1 Claim, 14 Drawing Sheets

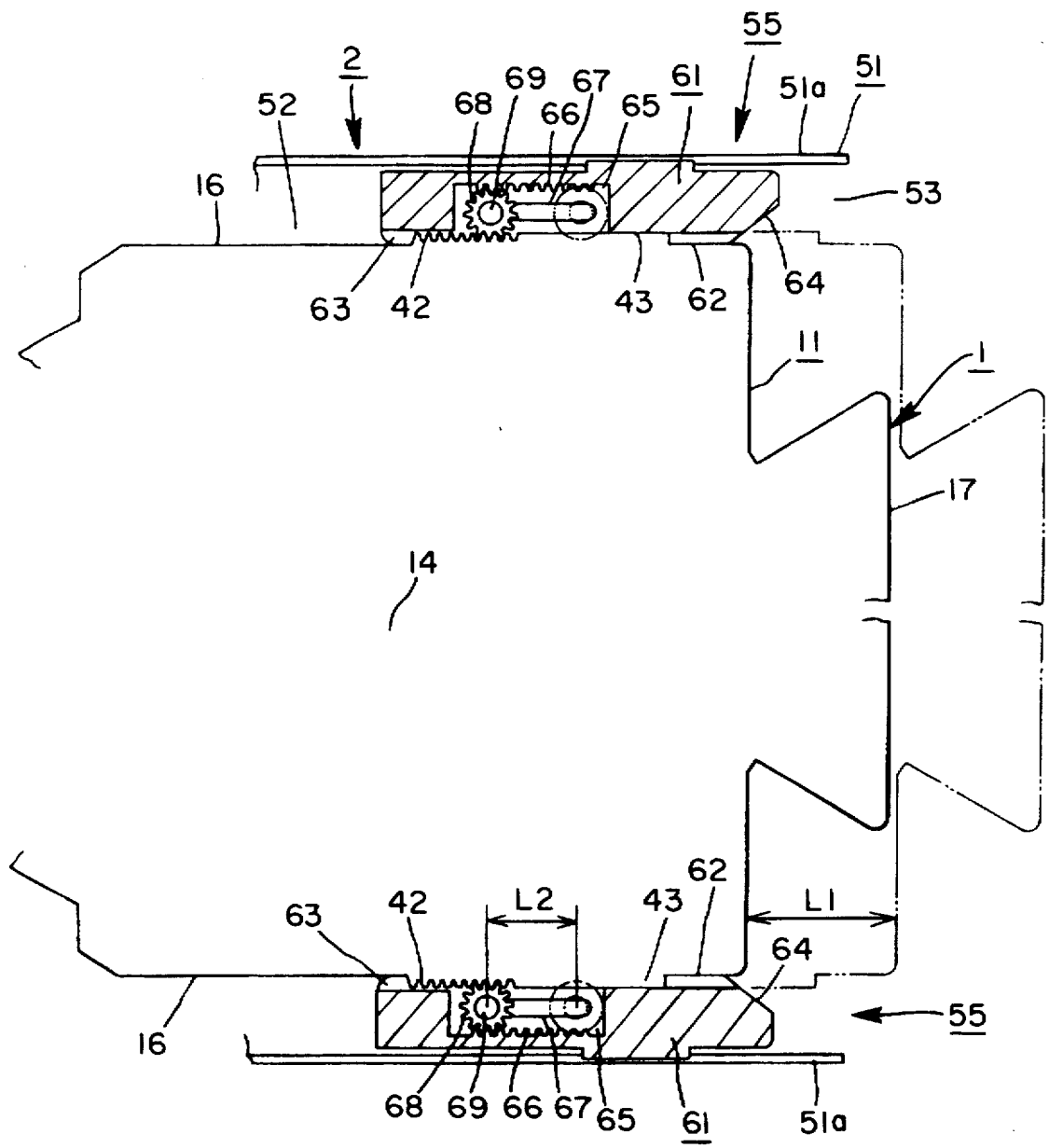
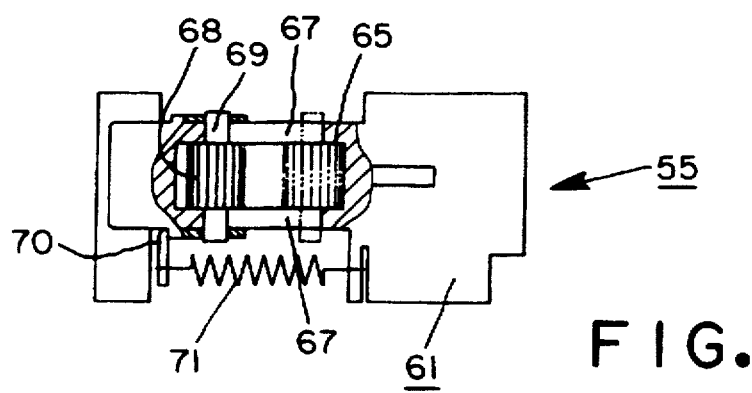
FIG. 5a
FIG. 5b

APPARATUS FOR READING AND WRITING READ/WRITE DISKS

DETAILED DESCRIPTION OF THE INVENTION

1. Field of the Invention

The present invention relates to an apparatus to perform reading and/or writing of a read/write disk which is being rotated on a turntable.

2. Description of the Prior Art

Examples of conventional apparatus for performing reading and/or writing of read/write disks include a CD changer and a CD player for playing compact disks (hereinafter referred to as a CD or CDs).

These apparatus perform playback of a CD by setting the disk on a turntable and while rotating the CD, read the data on the CD by means of a pickup which moves parallel to the diameter of the CD.

As described, for example, in Japanese Patent Publication Laid-Open No. 235248/1991, a conventional device of setting and removing a CD on and from a turntable is typically provided with a turntable and a movable pushing member which is capable of moving to and away from the turntable so that a CD can be snugly held against the turntable by the pushing member.

There is another configuration wherein a plurality of protrusions are provided around the turntable's cap portion which will be fitted in the center hole of a CD. The protrusions are capable of moving forward and backward so as to protrude from the surface of the cap portion and retreat therefrom. They are constantly biased in the direction of their advance. With the configuration as such, a CD can be supported against the turntable by pressing the CD around the cap portion manually or by means of a setting/removing device so that the protrusions come into contact with the edge of the center hole of the CD. When removing the CD from the turntable, it also has to be detached by force from the protrusions.

However, the configuration described in Japanese Patent Publication Laid-Open No. 235248/1991 requires a pushing member and external force to press the pushing member against the turntable. It also requires large space in the apparatus to permit the pushing member to move for setting or removing a CD.

The configuration which calls for protrusions of the cap portion of the turntable to support a CD, too, presents a problem in that external force is necessary to set and remove a CD; while it is difficult to set or remove a CD by hand within a confined apparatus, a setting/removing device requires considerable space within the apparatus.

In view of the prior art at the time the present invention was made, it was not obvious to those of ordinary skill in the pertinent art how an apparatus for reading and/or writing a read/write disk, wherein disk setting and removing is performed within a minimal space in the apparatus without the need of external force could be provided.

SUMMARY OF THE INVENTION

The long-standing but heretofore unfulfilled need for improvements in read/write apparatuses is now met by an improved read/write apparatus for read/write disks which includes a turntable having a cap portion onto which a center hole of a read/write disk can be fitted or removed; a turntable driving system for rotating the turntable in a forward or reverse direction; a plurality of clips for advancing or retreating from the circumstance of the cap portion, and, at their respective advanced positions, coming into contact with the rim of the center hole of the read/write disk and holding the read/write disk against the turntable; a fitting/removing lever mounted for rotating by a specified angle with respect tot he turntable, the fitting/removing lever having a catching portion which protrudes from the rim of the turntable; a head for moving in a radial direction of the read/write disk to perform reading and/or writing of the read/write disk, the head having a stopper which catches the catching portion of the fitting/removing lever at a position where the head approaches closest to the turntable; and a fitting/removing device wherein engagement of the catching portion of the fitting/removing lever with the stopper of the head when the turntable rotates in one direction causes the clips of advance and engagement of the catching portion of the fitting/removing lever with the stopper of the head when the turn table rotates in an opposite direction enables the clips to retreat.

BRIEF EXPLANATION OF THE DRAWINGS:

FIG. 5 shows the structure of an ejecting unit of said changer apparatus, wherein (a) and (b) respectively show a partially cutout plane, and a partially cutout outer side view.

Figure 1A:
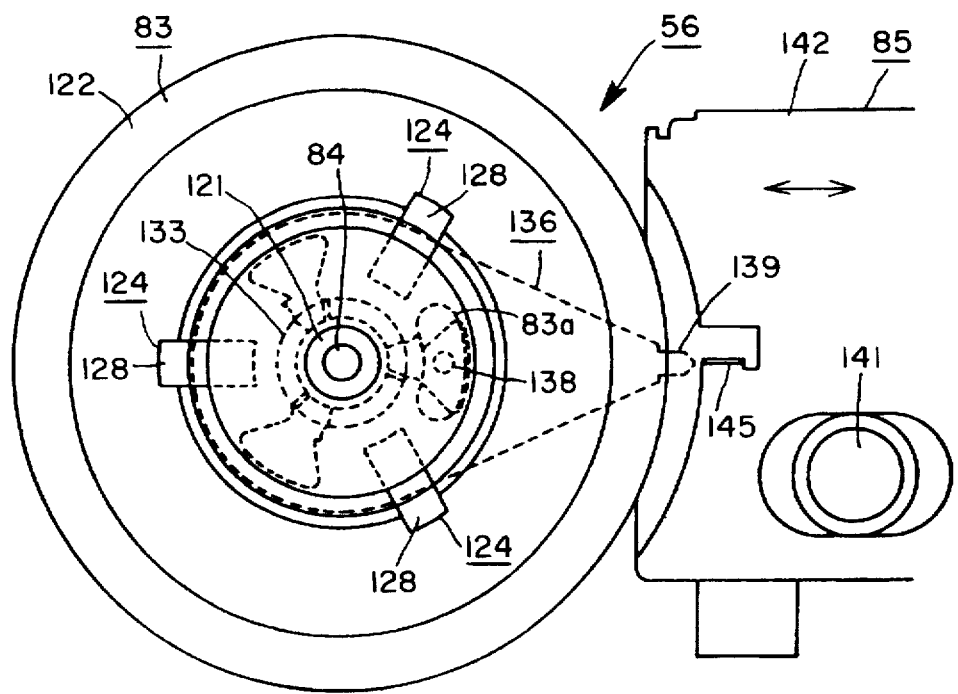
FIG. 1 shows the structure of a playback unit of a changer apparatus according to an embodiment of the present invention, wherein (a), (b) and (c) respectively show a plane of a part of said unit, a partially cutout side view of same in the unclamped state, and a partially cutout side view of same in the clamped state.

DETAILED DESCRIPTION OF THE PREFERRED EMBODIMENT:

An embodiment of the present invention is explained hereunder, referring to the drawings.

In this embodiment a read/write disk referred to in the appended claims is a read-only compact disk (hereinafter referred to as a CD), and the explanation is given of a CD changer which handles CDs, the CD changer explained herein serving as a read/write apparatus referred to in the claims of the invention.

Figure 3:
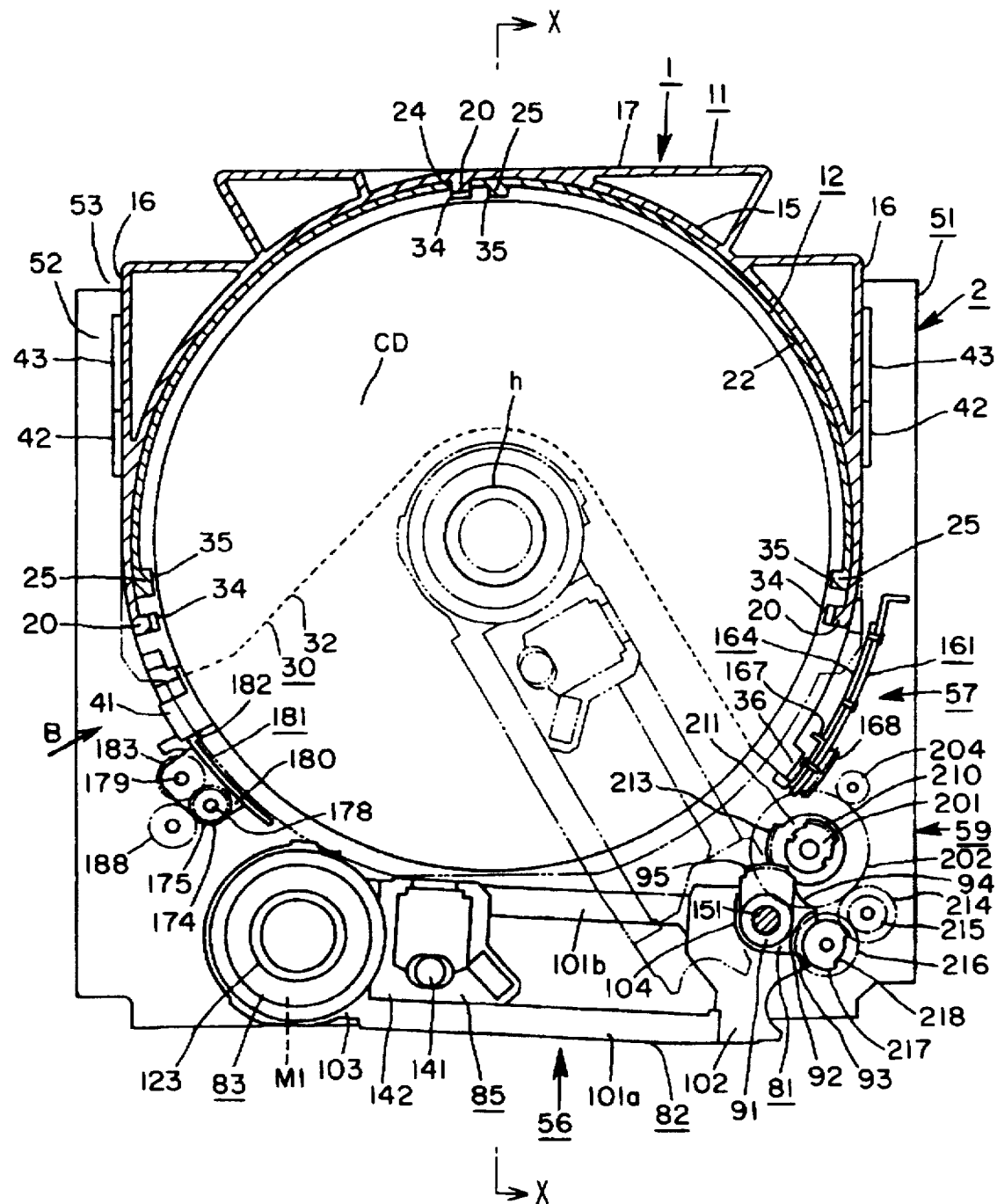
FIG. 3 is a partially cutout plane of said changer apparatus in the state where a magazine is set therein.

As shown in FIG. 3, a CD changer according to the embodiment consists of a magazine 1 for containing CDs therein and a changer apparatus 2 which permits magazine 1 to be attached thereto and performs playback function.

Figure 7:
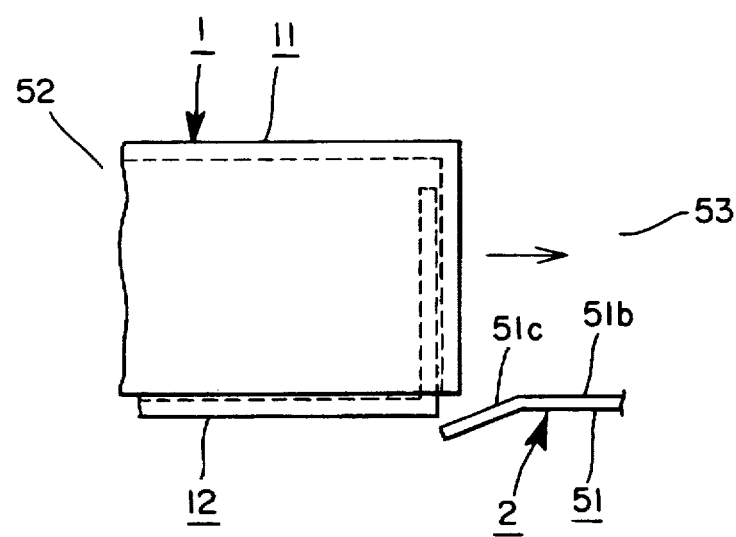
FIG. 7 is a side view of a guide means of said changer apparatus.
Figure 12:
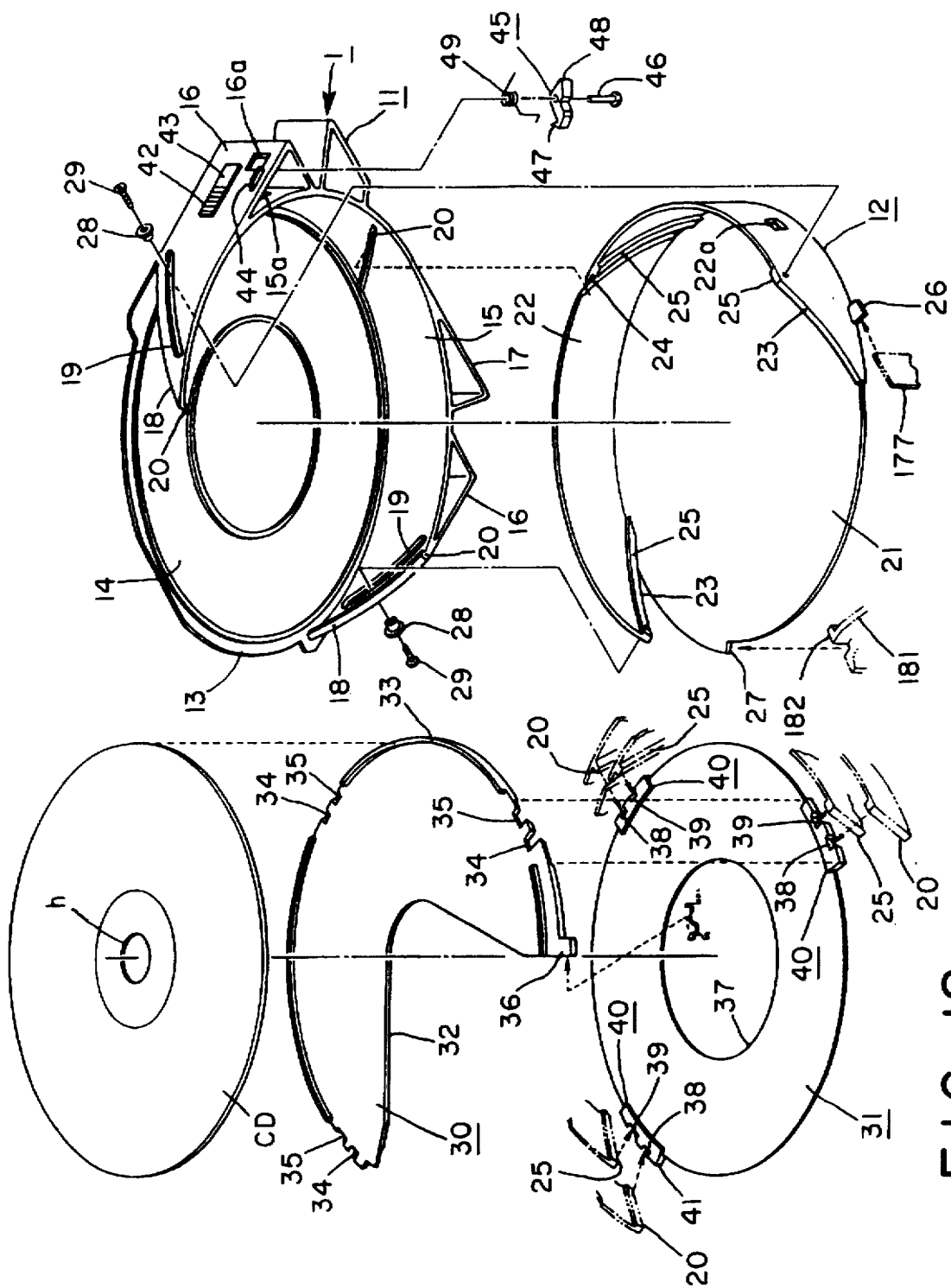
FIG. 12 is an exploded oblique view of a magazine of said embodiment.
Figure 13:
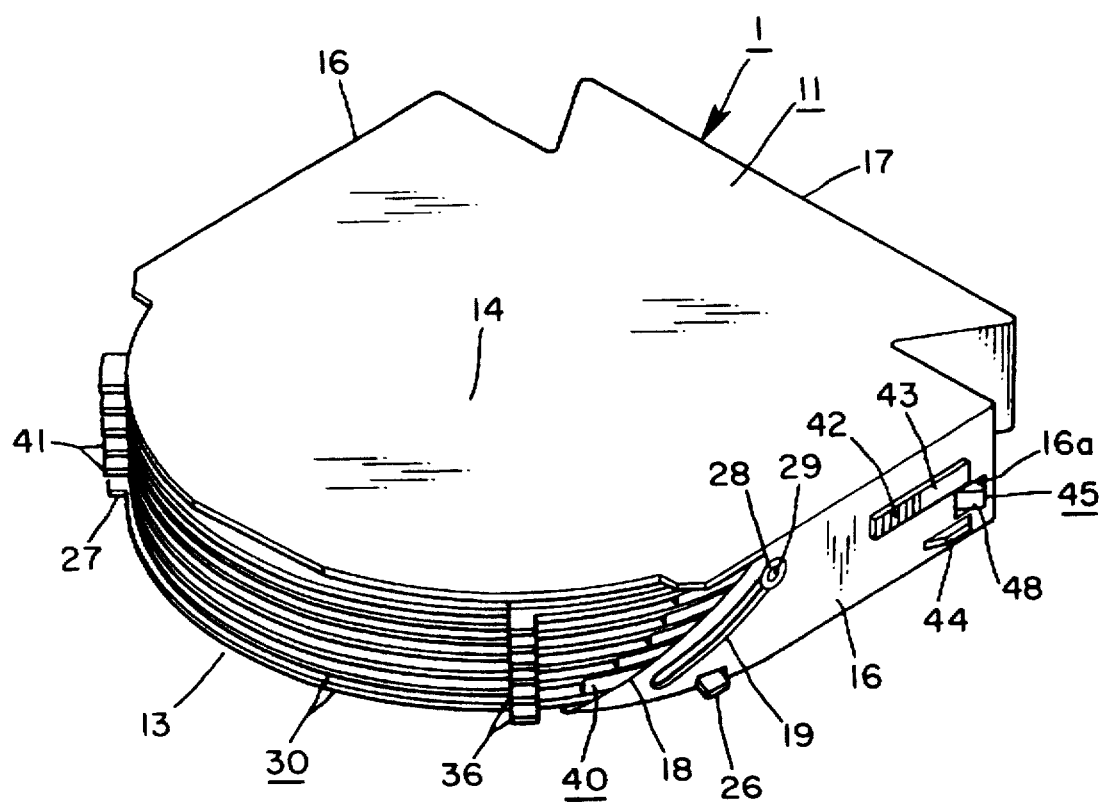
FIG. 13 is an oblique view of said magazine in the closed state.
Figure 14:
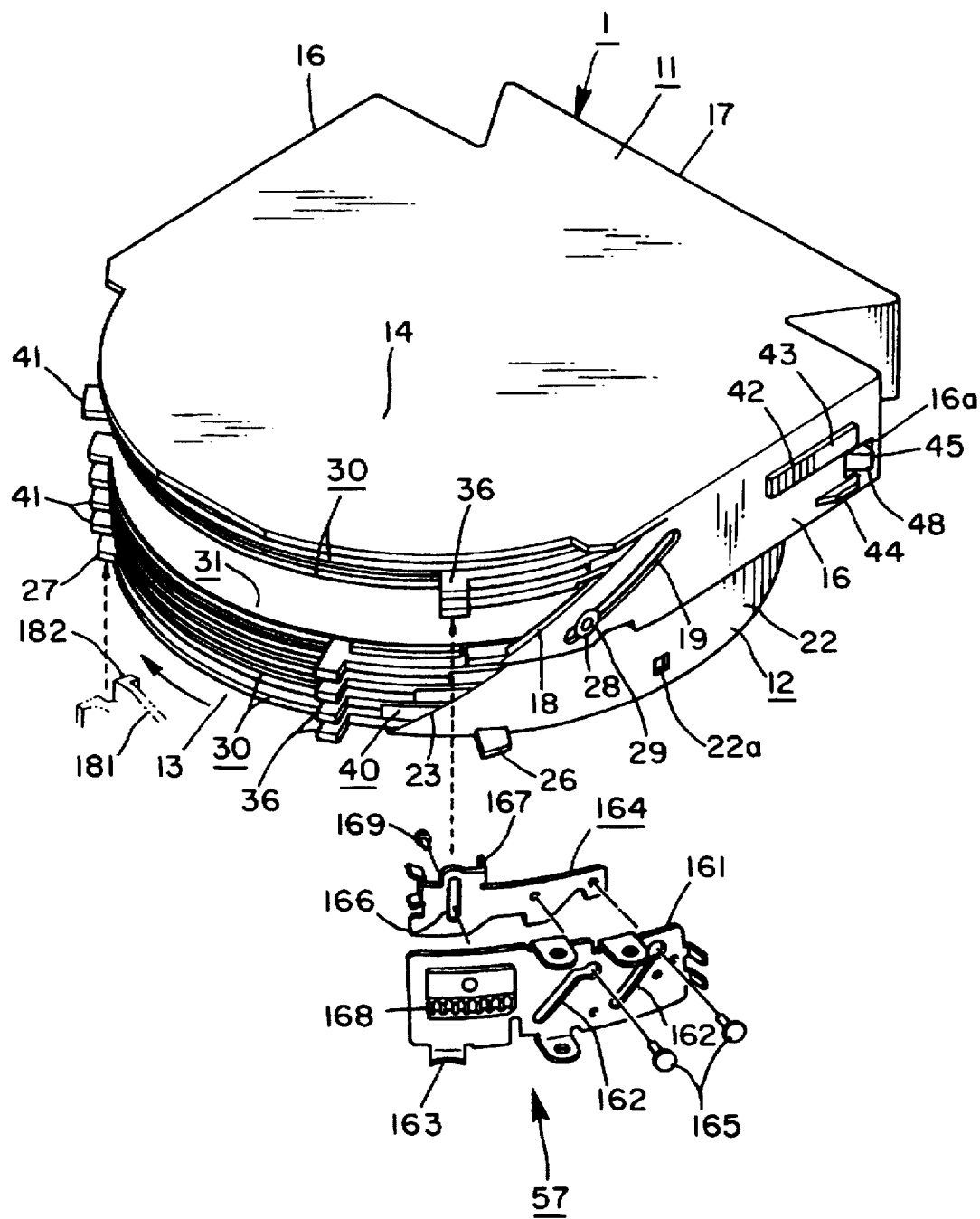
FIG. 14 is an oblique view of said magazine in the open state.

As shown in FIGS. 12 to 14, magazine 1 is provided with an outer body 11, inner body 12 and an opening 13 formed at the end which faces changer apparatus 2 when the magazine is inserted into the changer apparatus. In FIG. 7, the magazine is shown in its open state, with its outer body 11 having been turned around.

Outer body 11 comprises integrally formed various portions, such as a top plate portion 14, a curved wall portion 15 so extending downward from the lower surface of top plate portion 14 as to form a circle except for opening 13, side wall portions 16 located at opposing sides and parallelly extending in the direction in which the magazine is inserted, and an end wall 17 opposite the front end of the magazine. Each end of curved wall portion 15 which defines opening 13 is formed into an inclined edge 18 slanting downward to the left and a guide groove 19 is formed parallel to each inclined edge 18. Three inclined ridges 20 which have the same inclination as inclined edges 18 and project inward are formed on the inner surface of curved wall portion 15: one each on the inside of each inclined edge 18 and at a position across opening 13.

Inner body 12 comprises such integrally formed parts as an approximately circular bottom plate portion 21 and a curved wall portion 22 so extending upward from the edge of bottom plate portion 21 as to form a circle except for opening 13. Each end of curved wall portion 22 that defines opening 13 is an inclined edge 23 slanting downward to the left at the same angle as the aforementioned inclined edges 18, and a guide groove 24 is formed in the part of curved wall portion 22 across opening 13, at such a position as to permit inclined ridge 20 of outer body 11 to be engaged therein. Three inclined ridges 25 which have the same inclination as inclined edges 23 are formed on the inner surface of curved wall portion 22: one each on the inside of each inclined edge 23 and along guide groove 24. A closing protrusion 26 is formed at one end of curved wall portion 22, protruding outward from the outer surface of the round wall portion. Further, an opening protrusion 27 is formed at the edge of bottom plate portion 21, i.e. the edge defining opening 13.

Inner body 12 is fitted in outer body 11 with inclined ridge 20 being slidably caught in guide groove 24 and a screw 29 being screwed to inner body 12 through a sliding member 28 which is slidably caught in guide groove 19 of outer body 11. As a result of engagement with these members, screw 29 and sliding member 28 move downward when inner body 12 rotates counterclockwise with respect to outer body 11 and upward when inner body 12 rotates clockwise. Sliding member 28 and screw 29 together constitute the connection supporting means.

A plurality of holders 30 and separators 31 are stacked between outer body 11 and inner body 12, each holder 30 being capable of supporting one CD thereon and each separator 31 being sandwiched between two holders.

Each holder 30 is in the shape of a disk having a wedge-shaped cutout portion 32 formed at a position corresponding to opening 13, and a support wall 33 to hold the rim of a CD loaded on the holder is formed around the edge of the top of the holder and protrudes upward. A pair of recesses 34/35 is formed at three locations around the edge of holder 30 so that the aforementioned inclined ridges 20/25 are capable of being respectively engaged in corresponding recesses 34/35. A selecting lever 36 protruding outward is formed at one end of the rim of holder 30, where it is connected to cutout portion 32. As shown in FIG. 13, selecting lever 36 of each holder 30 is positioned in such a manner that all the levers align vertically when the magazine is closed.

Each separator 31 is in the shape of a disk having a hole 37 at the center, and three guide members 40 are attached to each separator 31, one each at three locations around the rim of the separator. Each guide member 40 has indentations 38 and 39 which are formed at such locations as to permit corresponding inclined ridges 20/25 to be respectively engaged therein. Guide members 40 located at the other end of opening 13, in other words the end opposite the end adjacent to selecting lever 36, are positioned in such a manner that their respective opening levers 41 align vertically as shown in FIG. 13 when the magazine is closed.

As shown in FIG. 14, by means of rotating holders 30 which are located below holder 30 that supports a selected CD counterclockwise together with inner body 12, said lower holders 30 are lowered in counterclockwise rotation. As a result, a space is formed between upper holders 30 and lower holders 30, permitting read-out of the selected CD to be conducted through the space. In the state where magazine 1 is thus open, levers 36 of lower holders 30 move downward to the left with respect to the positions of levers 36 of holders 30 which remain standstill, whereas opening levers 41 of lower separators 31 move downward to the left with respect to the positions of opening levers 41 of separators 31 which remain standstill.

Each one of the pair of side wall portions 16 that are provided at both sides of outer body 11 has a magazine-side rack gear 42 and a guide portion 43 which extend parallel to the direction in which the magazine is inserted. In addition, a guide piece 44 protruding outward is formed below guide portion 43.

A locking member 45 for locking outer body 11 and inner body 12 together when they are closed extends through the space between curved wall portion 15 and one of side wall portions 16. Locking member 45 is rotatably attached to side wall portion 16 by means of a pin 46 inserted through the middle portion of locking member 45. Formed at one end of locking member 45 is a tooth 47 which is capable of protruding inward through a window hole 15a formed in curved wall portion 15. The other end of locking member 45 is formed into an unlocking portion 48 which is capable of protruding outward through a window hole 16a formed in side wall portion 16. A spring 49 is attached to pin 46 in order to constantly apply force so that tooth 47 and unlocking portion 48 rotate and respectively protrude through window holes 15a, 16a.

With the configuration as above, when outer body 11 and inner body 12 are in the closed state, tooth 47 protruding through window hole 15a is caught in catching hole 22a formed in curved wall portion 22 of inner body 12, thereby locking the inner and other bodies together. In the locked state, unlocking portion 48 protrudes from window hole 16a so that the lock can be released by pushing unlocking portion 48 inward, producing resisting force of spring 49, thereby disengaging tooth 47 from catching hole 22a.

As shown in FIG. 3, changer apparatus 2 includes a case 51 which serves as the main body of the read/write apparatus referred to in the claims. Case 51 is an approximately square frame slightly larger than magazine 1 and has a magazine setting portion 52 therein. An insertion opening 53 through which magazine 1 may be inserted in and removed from the apparatus is formed in front of magazine setting portion 52.

Provided in case 51 are a pair of ejecting units 55 (shown in FIG. 5(a) and (b)), a playback unit 56 for playing a CD, a selecting unit 57 for selecting a CD to be played, an open/close unit 58 serving as the open/close device for opening and closing magazine 1, and a driving unit 59 serving as the transmission device for transmitting driving force to selecting unit 57 and open/close unit 58, wherein one each of ejecting unit 55 is located on opposing sides of magazine setting portion 52, playback unit 56 which serves as a read/write unit referred to in the appended claim is disposed in the back of magazine setting portion 52, selecting unit 57 is disposed to a side within the interior of magazine setting portion 52, and open-close unit 58 is disposed in the lower portion in the back of the interior of magazine setting portion 52.

As shown in FIG. 5(a) and (b), each ejecting unit 55 has a guide member 61 which is attached to the inner face of side plate 51a of case 51, at a position towards insertion opening 53. Guide member 61 has a guide surface 62 to guide each respective side wall portion 16 of outer body 11 of magazine 1 when magazine 1 is inserted into or removed from magazine setting portion 52. A guide groove 63 for catching therein rack gear 42 and guide portion 43 of magazine 1 is formed in each guide surface 62. A lead-in surface 64 inclined towards guide surface 62 and guide groove 63 is formed at the end of guide member 61 facing insertion opening 53.

A recess 65 is formed at the approximate center of guide surface 62 of each guide member 61. A fixed rack gear 66 extending parallel to the direction in which the magazine is inserted or removed is formed in the inner wall of recess 65, and one each elongated hole 67 extending parallel to the direction in which the magazine is inserted or removed is formed in the upper and the lower surface of recess 65.

A pinion gear 68 to engage with fixed rack gear 66 is disposed in recess 65. A rotary shaft 69 is inserted through pinion gear 68, with the upper and lower ends of rotary shaft 69 respectively inserted through elongated holes 67. The upper and lower ends of rotary shaft 69 protruding from elongated holes 67 are rotatably attached to a slide member 70, which is capable of sliding on guide member 61 in the direction parallel to the direction in which the magazine is inserted or removed. By means of a spring 71, which is stretched between slide member 70 and guide member 61 and serves as a biasing means, constant force is applied to slide member 70 and pinion gear 68 in the direction in which magazine 1 is ejected.

Figure 6:
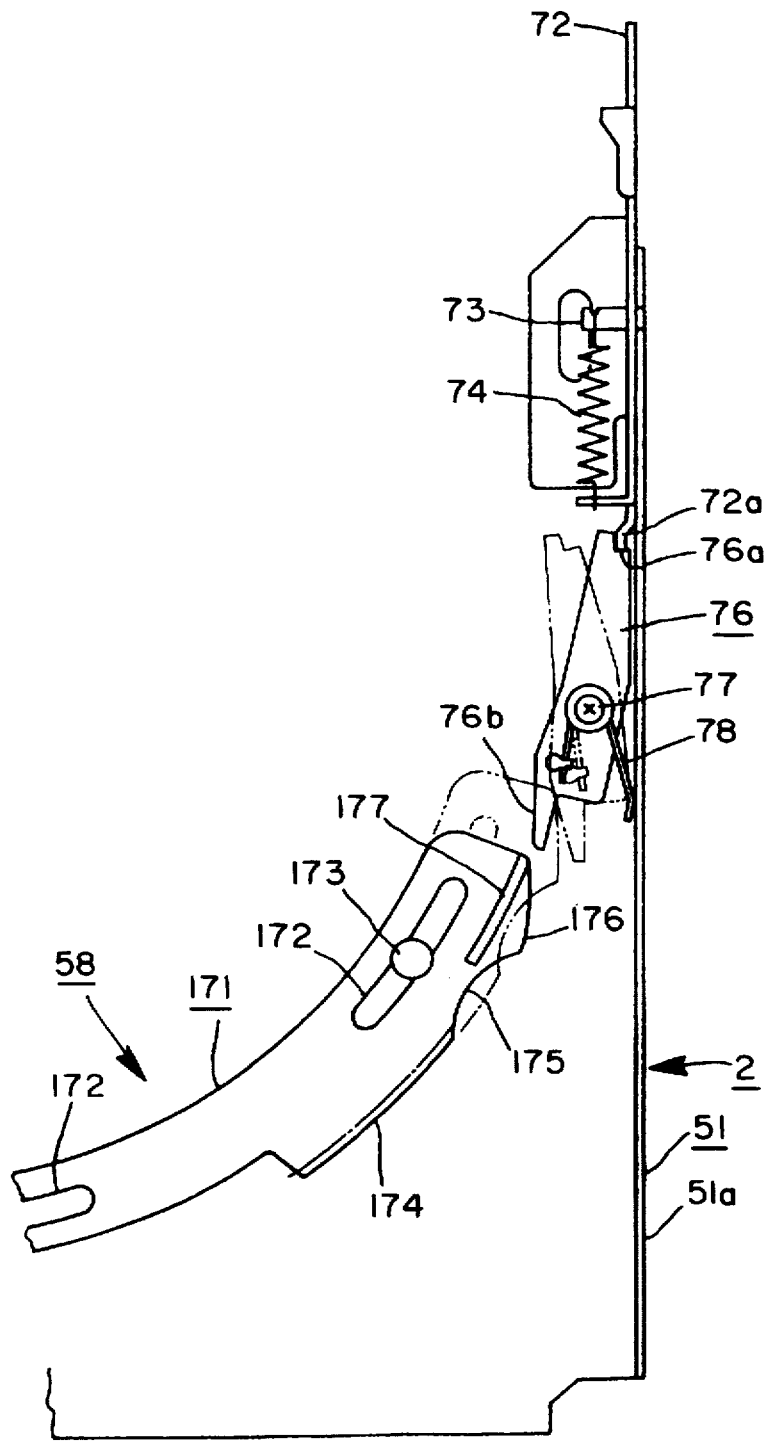
FIG. 6 is a plane of an ejecting mechanism of said changer apparatus.

Further, a magazine locking device (not shown) is provided in order to lock magazine 1 inserted into a specified position in magazine setting portion 52. Also provided is an ejection lever 72 for releasing the magazine from the locked state of this magazine locking device. As shown in FIG. 6, ejection lever 72 is so attached to the inner face of one of the pairs of side plates 51a of case 51 as to be capable of sliding parallel to the direction in which the magazine is inserted or removed. A spring 74 stretched between ejection lever 72 and a pin 73, which is attached to side plate 51a, constantly applies force to ejection lever 72 in the direction in which magazine 1 is ejected.

Ejection lever 72 is provided with an ejection prevention means 75 to prevent ejecting operation when magazine 1 is open. This ejection prevention means 75 comprises a lock lever 76 which is disposed at a position facing an end 72a of ejection lever 72 and so mounted by means of a screw 77 as to be capable of swinging. A spring 78 attached to screw 77 constantly applies force to lock lever 76 in order to hold the lock lever at the locking position. The locking position is represented by a solid line in FIG. 6, where a catching portion 76a at an end of lock lever 76 is engaged with end 72a. Formed at the other end of lock lever 76 is an abutting portion 76b with which a slider 171 of open-close unit 58 (described later) comes into contact when magazine 1 is closed. When abutting portion 76b is pushed, lock lever 76 is swung to an unlocking position represented by a two-dot chain line in FIG. 6, thereby permitting operation of ejection lever 72.

As shown in FIG. 7, the bottom of insertion opening 53 is formed of a bottom plate 51b of case 51. A guide plate 51c serving as a guide means is formed at the edge of bottom plate 51b, i.e. the edge facing magazine setting portion 52, in such a manner as to incline towards insertion opening 53. When magazine 1 is ejected in the half-closed state, with inner body 12 protruding from the lower end of outer body 11, the bottom of inner body 12 comes into contact with guide plate 51c, which, because it is inclined as explained above, pushes inner body upward until inner body 12 is completely encased in outer body 11.

As shown in FIGS. 1 to 4, playback unit 56 comprises a base 81, an arm 82 with its base end attached to base 81, a turntable 83, a motor MI serving as a driving system, and a head 85 mounted on arm 82. Turntable 83 and motor Ml are attached to the front end of arm 82.

Base 81 is in the shape of a plate having a cylindrical portion 91 formed on the upper surface thereof and serving as the center of rotation, and two indented portions, i.e. a stand-by indentation 93 and a playback indentation 94 with a rib 92 between the two indentations, are formed by cutting out a portion of the outer wall of cylindrical portion 91. Cylindrical portion 91 is provided with a screw threads (not shown) formed along the inside of cylindrical portion 91, a wedge-shaped gear portion 95 projecting from the upper part of the outer surface.

Figure 2A:
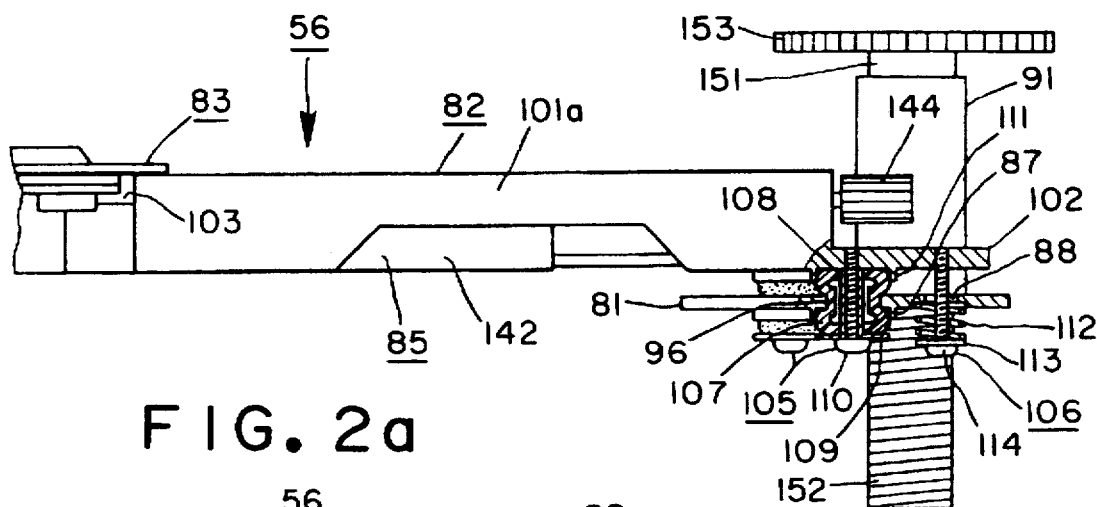
FIG. 2 shows the structure of the playback unit of the changer apparatus according to said embodiment, wherein (a), (b) and (c) respectively show a partially cutout side view, a partially cutout bottom view, and a partially cutout side view.
Figure 2B:
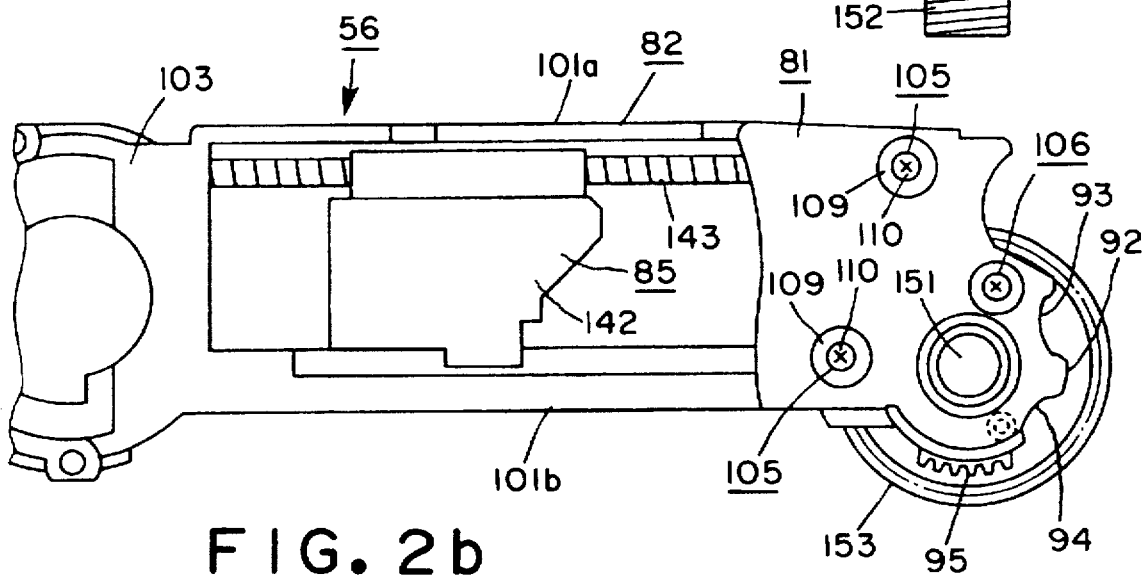
Figure 2C:
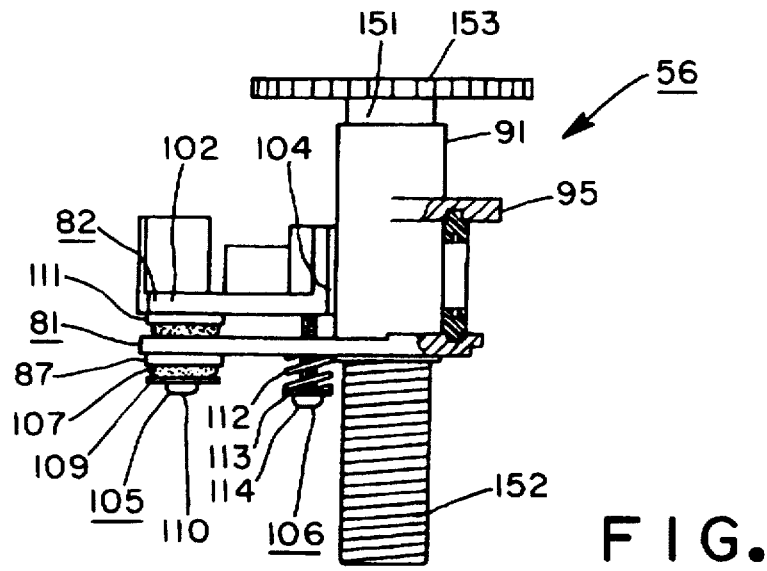

Arm 82 has a pair of arm portions 101a,101b, which are provided with a base-end mounting plate 102 and a front-end mounting plate 103 respectively formed at the base end and the front end of the arm. As shown in FIG. 2, base-end mounting plate 102 is attached to base 81 through two connecting means 105 and an adjusting means 106 and has a cutout portion 104 to have cylindrical portion 91 inserted therethrough.

Connecting means 105 are disposed near the respective connecting points of arm portion 101a,101b, which are closer to the front end of the arm than is cylindrical portion 91. Each connecting means 105 comprises a hollow bush 107, which is made of rubber or a similar material, a sleeve 108 having a pushing plate 109, and a connecting screw 110 which is inserted through sleeve 108 and screwed in base-end mounting plate 102. Bush 107 is fitted through a mounting hole 96 formed in base 81, and sleeve 108 is inserted upward into the center of bush 107, with a pushing plate 109 of sleeve 108 pushed against the lower surface of bush 107. Thus, while bush 107 is supported between base-end mounting plate 102 and pushing plate 109, base 81 is supported around the middle of bush 107, which serves as the cushion between base 81 and such other members as base-end mounting plate 102, sleeve 108 and connecting screw 110. In order to fit bushes 107, annular ribs 87,111 are formed on the respective lower surface of base 81 and base-end mounting plate 102, at the location around mounting hole 96 of base 81.

Adjusting means 106 is disposed closer to the base end of the arm than are connecting means 105. Adjusting means 106 comprises a spring 112 and an adjusting screw 112 serving as an adjuster. Adjusting means 106 serves as an elastic member disposed under a through hole 88 formed in base 81. Adjusting screw 114, having a washer 113 fitted therearound, is inserted through spring 112 and through hole 88 and screwed in base-end mounting plate 102. With the configuration as above, the elastic force of spring 112 is constantly applied through adjusting screw 114 to base-end mounting plate 102, thereby pushing base-end mounting plate 102 towards base 81.

As shown in FIG. 1, motor M1 is mounted on the lower face of front-end mounting plate 103 of arm 81, and turntable 83 is mounted around a spindle 84 protruding from the upper surface of front-end mounting plate 103.

Turntable 83 has a boss portion 121 affixed to spindle 84. A platform 122 for receiving a CD thereonto is formed around this boss portion 121, and a cap portion 123 onto which center hole h of a CD can be fitted or removed is formed on the center of the upper surface of platform 122. Three clips 124 and a fitting/removing device 125 for moving these clips 124 are disposed in cap portion 123 and covered by a cover 126.

Clips 124 are capable of moving in the radial direction, back and forth through respective apertures 127 that are formed at three locations around cap portion 123. Each clip 124 has an inclined lead-in surface 128 to guide a CD to be placed on turntable 83, an inclined supporting surface 129 for catching center hole h of a CD to press the CD against turntable 83, and a cam surface 130 which faces cap portion 123. Lead-in surface 128, supporting surface 129 and cam surface 130 are respectively located on the upper outer surface, the lower outer surface and the inner surface of clip 124.

Fitting/removing device 125 comprises an elevating plate 131 to be fitted around boss portion 121 and capable of moving only in the vertical direction, a spring 132 disposed on elevating plate 131 in order to push the elevating plate downward, and a rotatable cam plate 133 disposed underneath elevating plate 131. Therefore, when turntable 83 rotates by a specified angle in the forward direction in contact with cam plate 133, elevating plate 131 is elevated by a cam portion 134 of cam plate 133 to the unclamping position shown in FIG. 1(b) so that clips 124 become free to advance or retreat. When turntable 83 rotates by a specified angle in the reverse direction in contact with cam plate 133, elevating plate 131 is moved downward by the constant force of spring 132 to the clamping position shown in FIG. 1(c) so that a pushing portion 135 of elevating plate 131 pushes cam surfaces 130 of clips 124, thereby advancing clips 124.

A fitting/removing lever 136 is rotatably disposed underneath turntable 83, and a bush 137 is attached between fitting/removing lever 136 and front-end mounting plate 103 so as to cover a part of the lower surface of fitting/removing lever 136. Fitting/removing lever 136 is integrally connected to a cam plate 133 by means of a pin 138 inserted through a guide groove 83a, which is formed in turntable 83, so that fitting/removing lever 136 is allowed to rotate within a range where pin 138 is capable of moving in guide groove 83a. Fitting/removing lever 136 has a catching portion 139 which protrudes from the rim of turntable 83.

With the configuration as above, when catching portion 139 of fitting/removing lever 136 catches a stopper 145 of a head 85 (explained later) during forward rotation of turntable 83, cam plate 133, which is an integral body with fitting/removing lever 136, stops so that turntable 83 alone continues to rotate. As a result, by the constant force of spring 132, elevating plate 131 which has been released from the pushing force applied by cam portion 134 of cam plate 133 is lowered to the clamping position shown in FIG. 1(c). The lowered elevating plate 131 causes clips 124 to advance from cap portion 123 so that supporting surface 129 of each respective clip 124 catches center hole h of the CD, thereby clamping it. On the other hand, when catching portion 139 of fitting/removing lever 136 catches a stopper 145 of a head 85 during reverse rotation of turntable 83, cam plate 133, which is an integral body with fitting/removing lever 136, stops so that turntable 83 alone continues to rotate. As a result, elevating plate 131 is moved upward to the unclamping position shown in FIG. 1(b) by cam portion 134 of cam plate 133 so that clips 124 become free to advance or retreat, thereby unclamping the CD.

Figure 4:
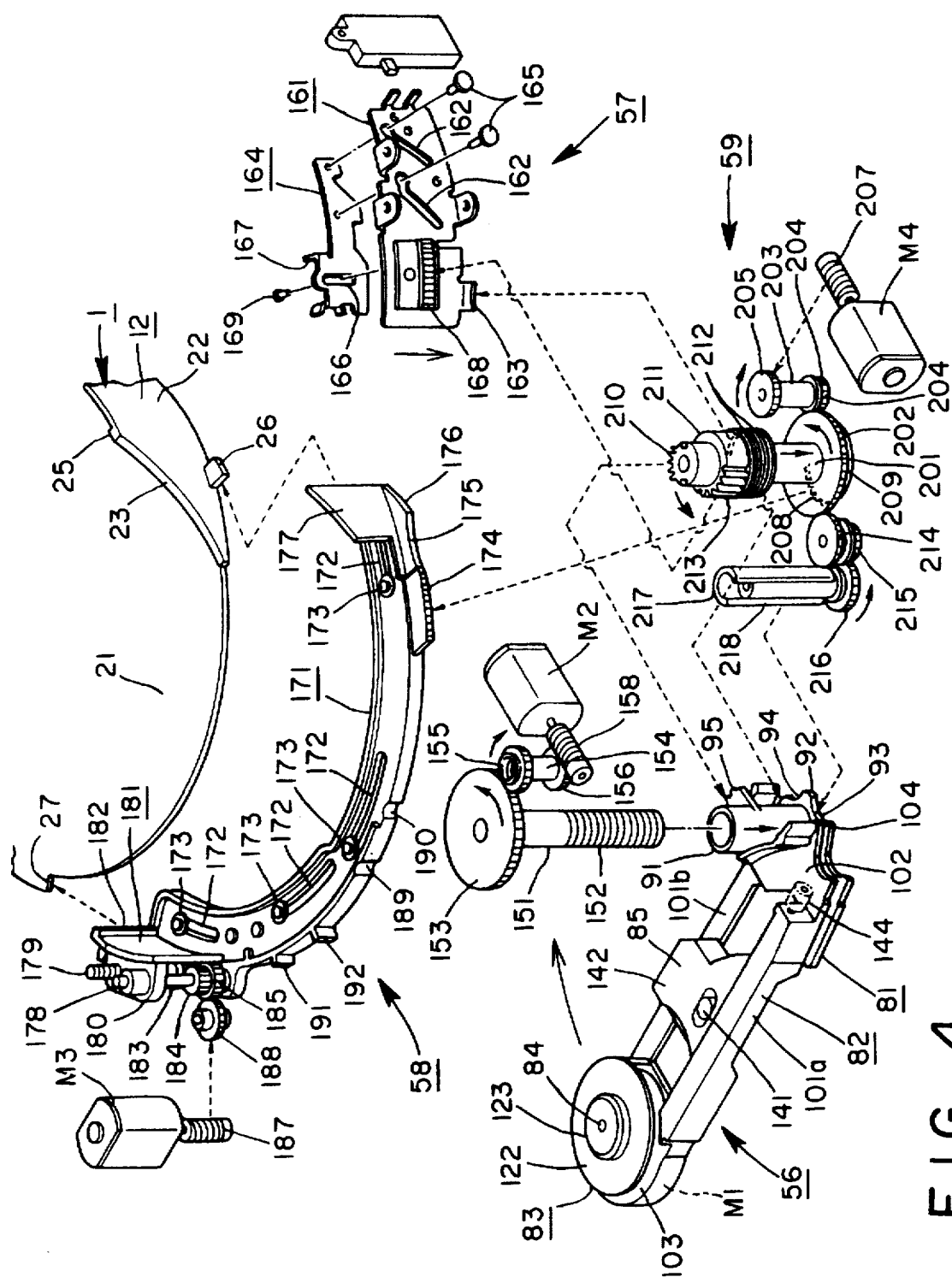
FIG. 4 is an exploded oblique view of a part of said changer apparatus.

Head 85 has a moving body 142, which is provided therein a laser pickup 141. As shown in FIGS. 2 and 4, moving body 142 is attached to a threaded shaft 143, which is disposed along the inner face of arm portion 101a, moving body 142 being capable of moving along arm portions 101a,101b of arm 82. A gear 144 is attached to an end of threaded shaft 143 so that moving body 124 can be moved by driving this gear 144 in the forward or reverse direction by means of a delivery motor (not shown). Laser pickup 141 performs read-out function by emitting laser light upward and receiving the light reflected by the CD.

As shown in FIG. 1, moving body 142 is provided with a stopper 145 which catches catching portion 139 of fitting/removing lever 136 at the innermost position where stopper 145 comes closest to turntable 83.

As shown in FIGS. 3 and 4, a threaded shaft 151 serving as a supporting shaft is vertically and rotatably disposed in case 51. Cylindrical portion 91 of playback unit 56 is fitted around the outer surface of threaded shaft 151, with screw threads of cylindrical portion 91 being screwed around male screw 152 of threaded shaft 151. Formed at the upper end of threaded shaft 151 is a gear 153, which is interlocked with a gear 155 of a gear shaft 154 rotatably attached to case 51. Gear shaft 154 also has a gear 156, which is interlocked with a worm gear 158 of a motor M2 that is attached to case 51 and serves as an elevating means. Therefore, through forward or reverse operation of elevation motor M2, threaded shaft 154 rotates in the forward or reverse direction, thereby moving playback unit 56 up or down.

Figure 8:
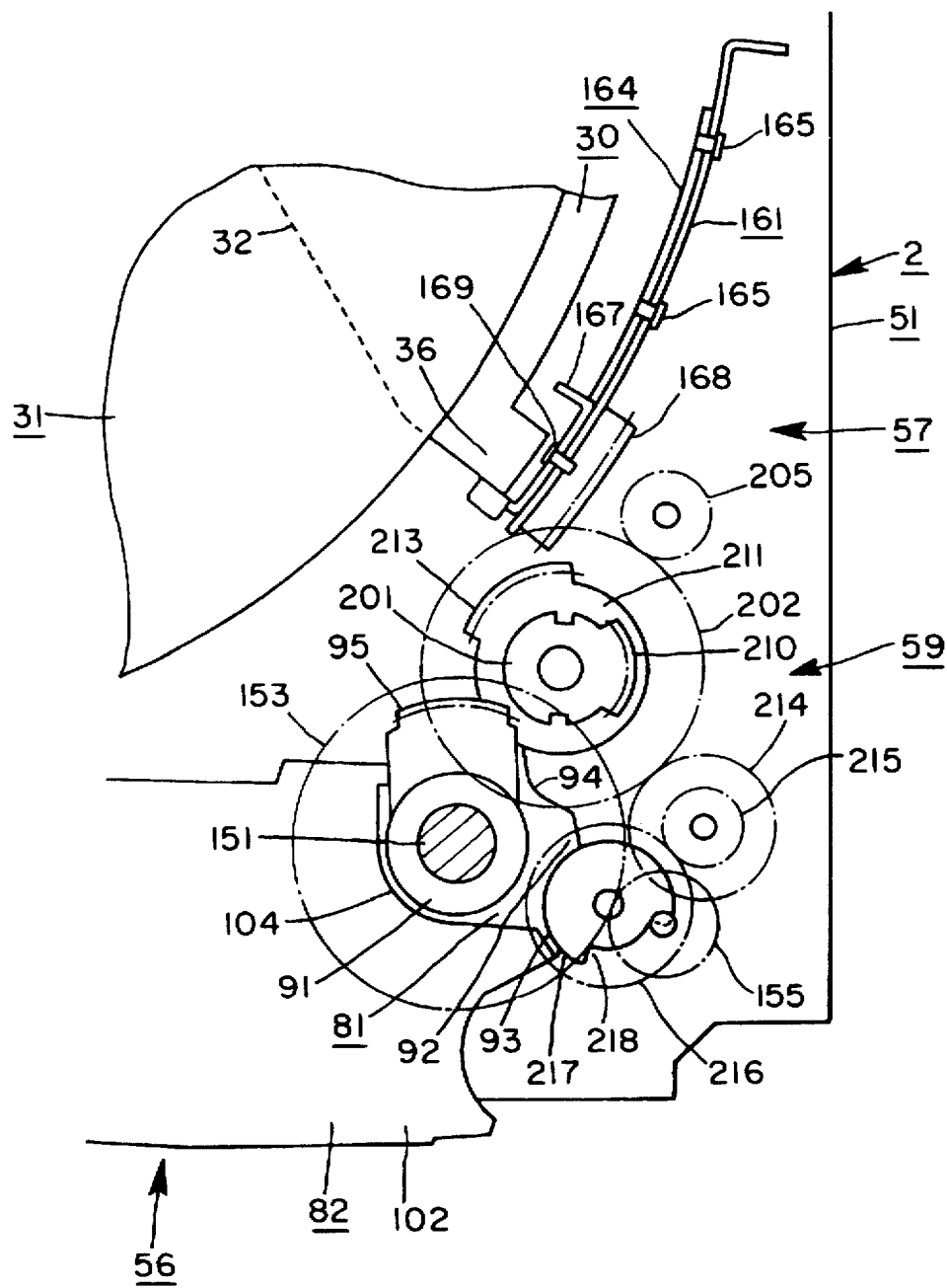
FIG. 8 is a partially cutout plane of said changer apparatus.

Next, the configuration of selecting unit 57 is explained. A bracket (not shown in the drawings) is vertically disposed in case 51. As shown in FIGS. 3, 4 and 8, selecting unit 57 has a sliding plate 161 which is so attached to said bracket as to be capable of moving up and down. Two slanted grooves 162 slanted at the same angle as inclined edge 23 of magazine 1 and the other aforementioned inclined edges are formed towards one end, i.e. the right end as shown in FIG. 4 in case of this embodiment (hereinafter called the right end) of sliding plate 161. Sliding plate 161 is also provided with a horizontal groove (not shown), which is formed towards the other end, i.e. the left end as shown in FIG. 4 in case of this embodiment (hereinafter called the left end) of the sliding plate, and a catching piece 163 projecting from the lower corner of the left end of the plate towards driving unit 59.

A holder selector 164 is disposed at the inner side of sliding plate 161. By means of a pair of fasteners 165 attached through respective slanted grooves 162 to the right end of sliding plate 161, holder selector 164 is supported in such a manner as to be capable of diagonally sliding along slanted grooves 162. Formed near the other end of holder selector 164 are a vertical groove 166 and a supporting frame 167 which has an approximately U-shaped section and is so formed as to fit over selecting lever 36 of magazine 1, sandwiching both sides of selecting lever 36.

A rack gear 168 is disposed on the outer side of sliding plate 161, closer to the left end of the sliding plate than to the right end of the sliding plate. By means of a fastener 169 attached through vertical groove 166 of holder selector 164 and the horizontal groove of sliding plate 161 to the sliding plate 161, rack gear 168 is supported in such a manner as to be capable of horizontally sliding along the horizontal groove together with diagonal sliding of holder selector 164.

Further, the aforementioned bracket, sliding plate 161 and holder selector 164 are curved to fit along the curved wall of magazine 1.

Figure 9:
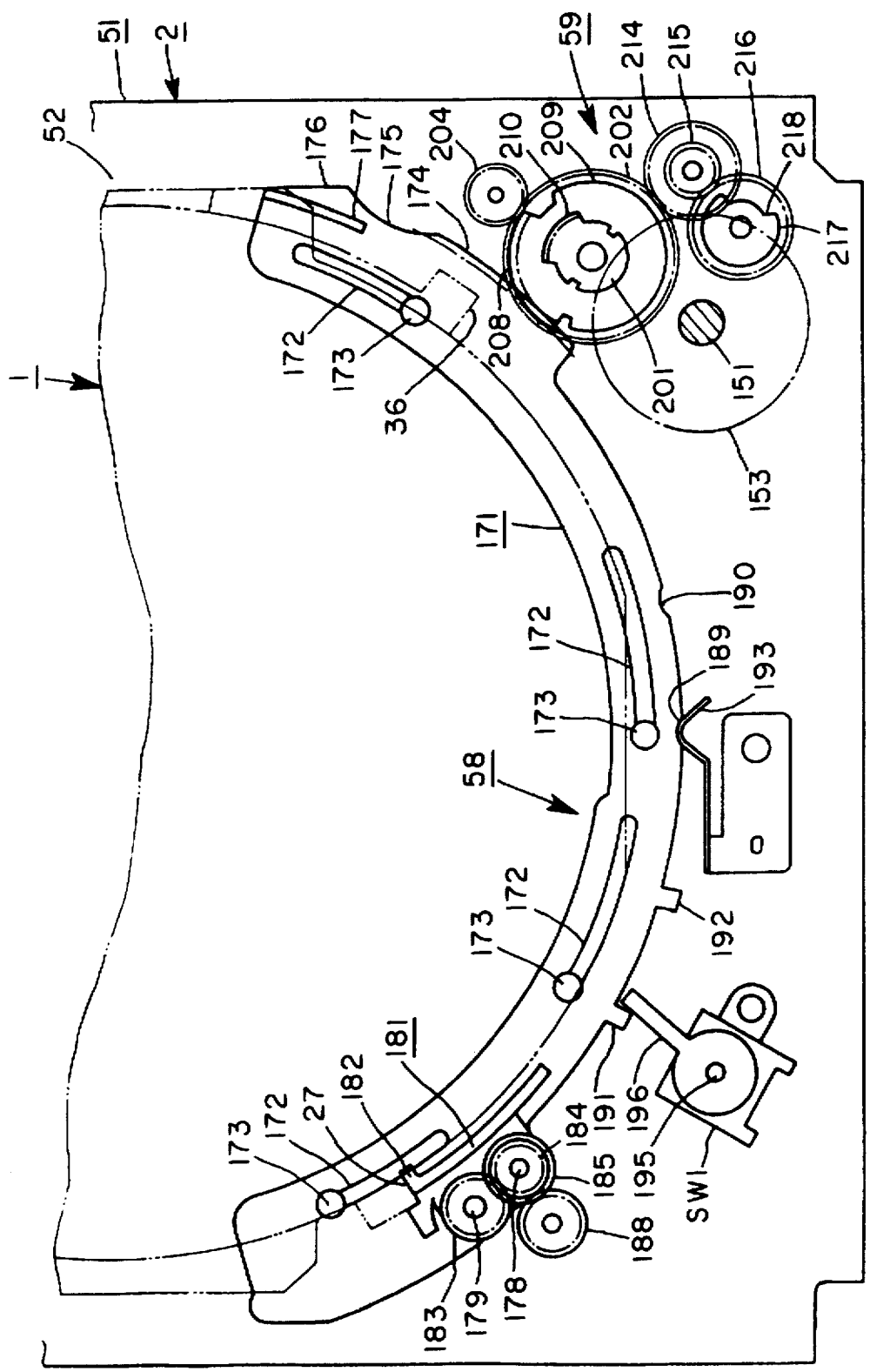
FIG. 9 is a partially cutout plane of said changer apparatus.
Figure 10:
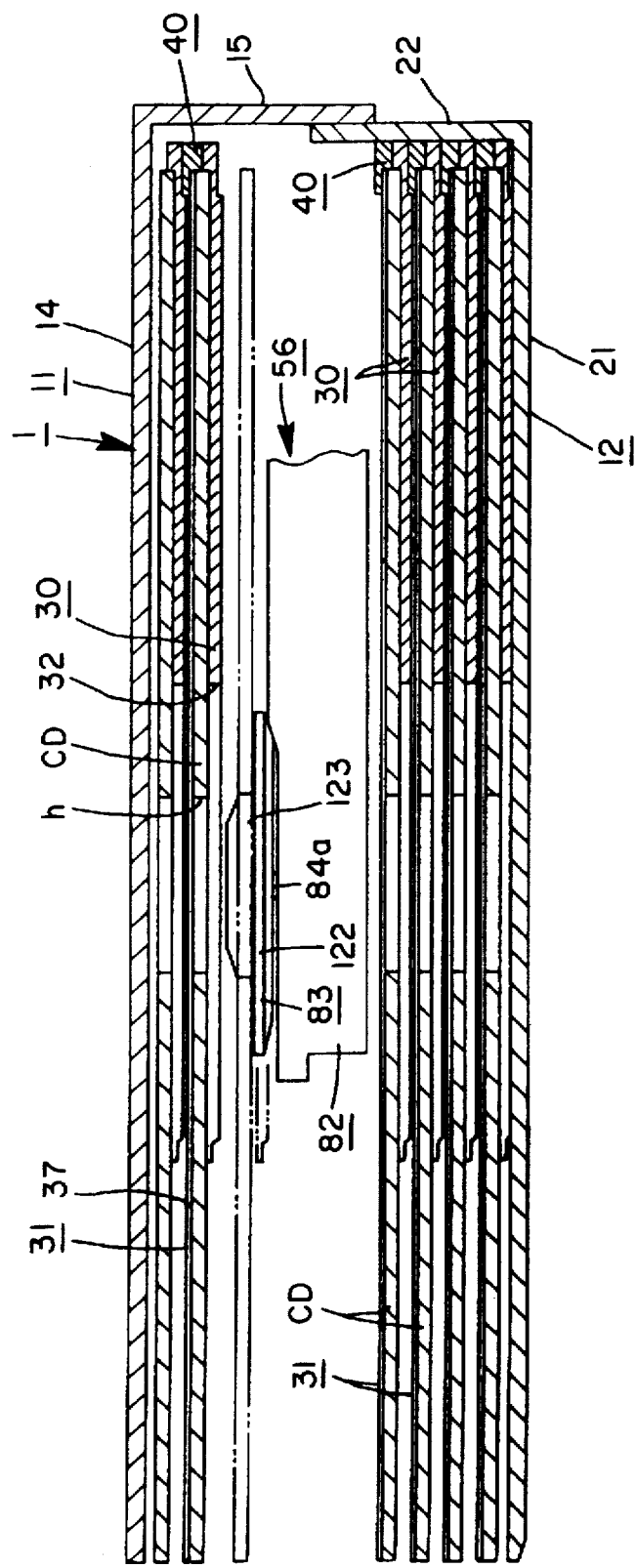
FIG. 10 is a sectional view of said changer apparatus taken along the line X—X of FIG. 3.

As shown in FIGS. 4 and 9, open/close unit 58 has an arc-shaped slider 171 corresponding to the curved surface of magazine 1, i.e. the portion defining opening 13. By means of fasteners 173 fitted in four grooves 172 that are respectively formed near both ends and the center of slider 171, slider 171 is mounted on case 51 in such a manner that slider 171 is capable of freely sliding in a direction parallel to the curved edge of the magazine, between the closing position that corresponds to the position magazine 1 is closed, i.e. the position slider 171 reaches when rotating clockwise, and the opening position corresponding to the position magazine 1 is opened, i.e. the position slider 171 reaches when rotating counterclockwise.

A gear portion 174, a recess 175 for determining the opening position, and a pushing portion 176 are formed at an end of slider 171, on the outer rim of the end portion of slider 171. Slider 171 is also provided with a catching portion 177 for closing the magazine, catching portion 177 vertically protruding from the upper surface of said end portion and being capable of catching closing protrusion 26 of magazine 1. As shown in FIG. 6, when slider 171 reaches its closing position, pushing portion 176 comes into contact with abutting portion 76b, thereby rotating lock lever 76 to the unlocking position.

Provided at the other end of slider 171 are a supporting shaft 178 vertically disposed on the slider, a threaded shaft 179 vertically and rotatably disposed on same, and an separator selector 181 having an attachment 180 which is slidably fitted around supporting shaft 178 and screwed around threaded shaft 179. Separator selector 181 has an opening catching portion 182 which is capable of being engaged in opening protrusion 27 of inner body 12 of magazine 1. Affixed to threaded shaft 179 is a gear 183, which is engaged with a gear 184 rotatably provided around supporting shaft 178. A worm gear 187 of an elevation motor M3, which is mounted on slider 171, is engaged through a gear 188 with a gear 185 that rotates integrally with gear 184. Therefore, through forward or reverse operation of elevation motor M3, threaded shaft 179 rotates in the forward or reverse direction, thereby moving separator selector 181 up or down.

A closing indentation 189 and an opening indentation 190 are formed in the outer surface of slider 171, near the center of the slider. A closure detection piece 191 and an opening detection piece 192 are also formed at this region.

Further, as shown in FIG. 9, a leaf spring 193 facing the outer surface of slider 171 is attached to case 51. Being in contact with the outer surface of slider 171, leaf spring 193 is caught in closing indentation 189 when slider 171 is at its closing position and in opening indentation 190 when slider 171 is at its opening position, thereby holding slider at the closing position or the opening position.

Furthermore, a switch SW1 serving as a detector is attached to case 51, at a position facing the outer surface of slider 171. Switch SW1 comprises a detection lever 196 attached to a detection shaft 195, in such a manner that detection lever 196 is capable of coming into contact either with closure detection piece 191 or opening detection piece 192, in other words detection lever 196 swings by being pushed by closure detection piece 191 when slider 171 reaches the closing position, and by opening detection piece 192 when slider 171 reaches the opening position. Therefore, slider 171's reaching the closing position or the opening position can be detected through swing of detection lever 196.

As shown in FIGS. 3, 4, 8 and 9, driving unit 59 has a shaft 201 which is vertically and rotatably disposed in case 51. Formed around the lower part of shaft 201 is a gear 202, which is engaged with a gear 204 of a gear shaft 203 rotatably attached to case 51. A worm gear 207 of a loading motor M4 serving as a driving means and attached to case 51 is engaged with a gear 205 of gear shaft 203. Therefore, through reverse or forward operation of loading motor M4, shaft 201 rotates in the reverse direction (the direction represented by an arrow in FIG. 4, i.e. the direction in which slider 171 and playback unit 56 move to the opening position and playback position respectively) or the forward direction (the direction opposite to that represented by the arrow in FIG. 4, i.e. the direction in which slider 171 and playback unit 56 move to the closing position and stand-by position respectively).

Formed under gear 202 of shaft 201 are a gear portion 208, which is capable of catching gear portion 174 of slider 171, and a disk portion 209 to be caught in recess 175 that determines the opening position. Gear portion 208 is formed only within a specified angle range in which gear portion 208 may be engaged with gear portion 174, and the remaining angle range is accounted for by disk portion 209.

A gear portion 210 which is capable of being engaged with gear portion 95 of playback unit 56 is formed above gear portion 202 of shaft 201, more precisely towards the upstream end of reverse rotation of gear portion 208, gear portion 210 extending along the total axial length of the portion of shaft 201.

A vertically slidable tube-shaped cylinder 211 is disposed above gear 202 of shaft 201 and is fitted around gear portion 210. Cylinder 211 has grooves 212, which are formed around the lower part of the wall of cylinder 211 and receive base 81 of playback unit 56 and catching piece 163 of sliding plate 161 therein. Cylinder 211 also has a gear portion 213, which is formed at a distance from gear portion 210 and is capable of catching rack gear 168 that is integrally formed with holder selector 164. As a result of this configuration, playback unit 56 vertically moves together with sliding plate 161 through cylinder 211.

A gear 214 vertically and rotatably disposed in case 51 is engaged with gear 202 of shaft 201. A gear 215 working integrally with gear 214 is engaged with a gear 216 which is vertically and rotatably disposed in case 51 at a position adjacent to threaded shaft 151 of playback unit 56. Gear 216 is provided with a cam shaft 217, which is formed on gear 216 as an integral body therewith. The cylindrical wall of cam shaft 217 is capable of being engaged in stand-by indentation 93 or playback indentation 94 of base 81. Cam shaft 217 is provided with a cutout portion 218, which is formed in the wall of cam shaft 217 so as to face rib 92, thereby permitting playback unit 56 to rotate when playback unit 56 is caused to rotate.

Next, the function of the present embodiment is explained.

First of all, the function of magazine 1 is explained. When setting CDs in magazine 1, insert CDs through opening 13 and place them on respective holders 30 of magazine 1 with the recorded side of each CD facing down. As an alternative way, CDs can also be set by releasing magazine 1 from the lock and opening outer body 11 and inner body 12.

As magazine 1 is in the locked state with outer body 11 and inner body 12 closed together by means of locking member 45, there is no danger of outer body 11 and inner body 12 accidentally opening when magazine 1 is being handled. Therefore, magazine 1 can be safely inserted or removed from changer apparatus 2 in the closed state.

Next, explanation is given about insertion and removal of magazine 1 in and from changer apparatus 2.

When setting magazine 1, insert magazine 1 that has CDS set therein through insertion opening 53 of changer apparatus 2 into magazine setting portion 52, with opening 13 of magazine 1 head-first.

When magazine 1 is inserted through insertion opening 53 further inward along the two guide members 61 as shown in FIG. 5, magazine 1 eventually reaches the position represented by two-dot chain lines in the drawing, where rack gears 42 of the magazine come into engagement with respective pinion gears 68 so that pinion gears 68, while being engaged with rack gears 42,66 and resisting the constant force of springs 71, revolve in the direction in which magazine 1 is inserted. When magazine 1 is inserted to a specified position in magazine setting portion 52, a magazine locking device (not shown) locks magazine 1 at that position.

At that time, distance L1 traveled by magazine 1 after the time when rack gears 42 of magazine 1 become engaged with pinion gears 68 is approximately twice as long as distance L2 traveled by each pinion gear 68 while revolving.

When removing magazine 1, push ejection lever 72 to release the magazine from locking by the magazine locking device. As ejection lever 72 can be operated only in the state shown in FIG. 6 where slider 171 is at the closing position with its pushing portion 176 having come into contact with abutting portion 76b and rotated locking lever 76 to the unlocking position, magazine 1 is prevented from being ejected when the magazine is open.

As a result of releasing magazine 1 from the lock, the constant force of springs 71 pushes respective pinion gears 68 so that pinion gears 68, which are engaged with rack gears 42,66, revolve in the direction in which magazine 1 is ejected, and magazine 1, with its rack gears 42 engaged with pinion gears 68, move in the magazine ejecting direction until its rear part projects from insertion opening 53.

At that time, distance L1 traveled by magazine 1 is approximately twice as long as distance L2 traveled by each pinion gear 68 while revolving Therefore, the configuration of the embodiment is capable of reducing the size of the sides of ejecting unit 55 extending parallel to the direction in which the magazine is inserted or removed while ensuring the sufficient distance to eject magazine 1. As insertion and ejection of magazine 1 can be performed smoothly, the embodiment also ensures comfortable and pleasing operation.

During the insertion of magazine 1 into magazine setting portion 52, unlocking portion 48 of locking member 45 comes into contact with the corresponding guide member 61, thereby rotating locking member 45. As a result, outer body 11 and inner body 12 are released from the lock so that magazine 1 can be opened. During the ejection of magazine 1, unlocking portion 48 of locking member 45 becomes disengaged from guide member 61 so that locking member 45 rotates to lock outer body 11 and inner body 12 together.

As shown in FIG. 7, should magazine 1 be going to be ejected in the state where inner body 12 is not completely enclosed, the bottom of inner body 12 abuts against guide plate 51c, and the slanted surface of guide plate 51 guides inner body upward. The invention thus ensures that inner body 12 be completely enclosed in outer body 11 when the magazine is ejected.

Next, changer apparatus 2 is explained hereunder.

Figure 1B:
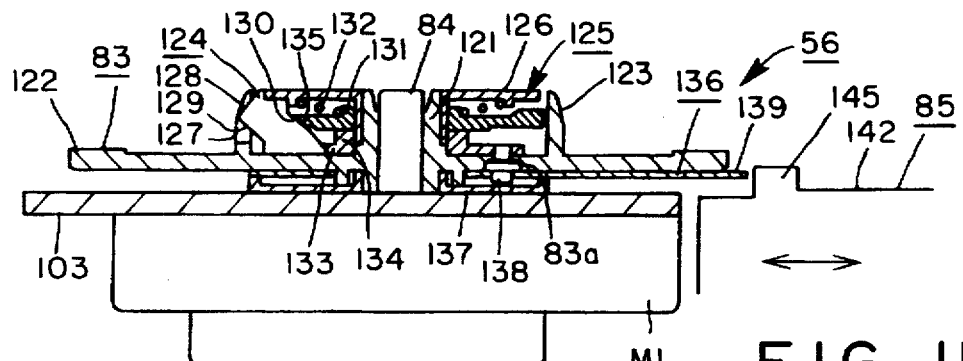
Figure 1C:
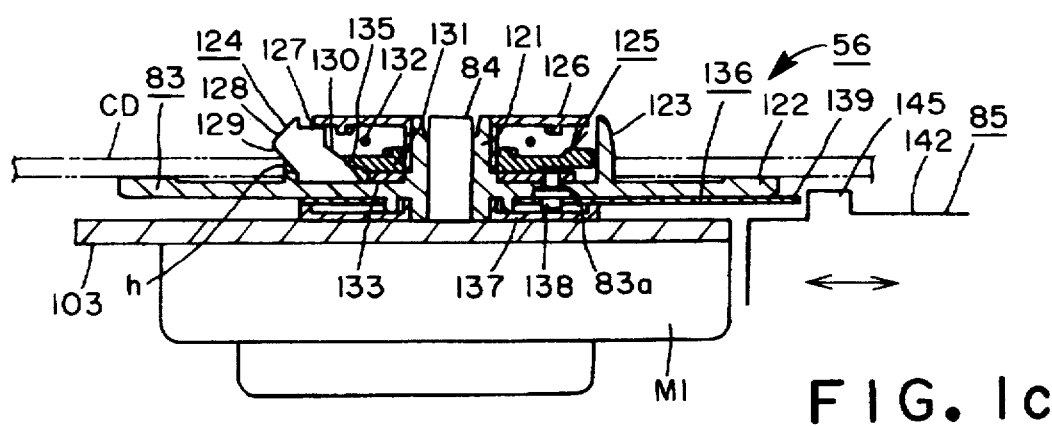

When changer apparatus 2 is in the stand-by mode, as shown in FIG. 3, arm 82 of playback unit 56 is in the stand-by position deep inside magazine setting portion 52 and locked at the stand-by position, with the wall of cam shaft 217 caught in stand-by indentation 93 and the height of the arm corresponding to the height of the first CD in cases where initializing has taken place, or corresponding to the height that of the CD which has been previously replayed. Head 85 on arm 82 is located at the outermost end (the base end). As shown in FIG. 1(b), clips 124 of turntable 83 are able to advance or retreat, because elevating plate 131 is elevated by cam portion 134 of cam plate 133 to the unclamping position.

Sliding plate 161 of selecting unit 57 is always at the same height as that of playback unit 56. Because rack gear 168 of the holder selector is in contact with the wall of cylinder 211 and located at the end of the horizontal groove of sliding plate 161, i.e. the end close to slanted grooves 162, holder selector 164 attached to sliding plate 161 is located at the highest point that holder selector 164 can reach when it moves upward along slanted grooves 162.

As shown in FIG. 9, slider 171 has been rotated clockwise to its closing position and locked at that position, with a part of gear portion 174 engaged with gear portion 208 of shaft 201 and leaf spring 193 caught in closing indentation 189. Separator selector 181 on slider 171 is located at the position corresponding to that of the first CD or the CD which has been previously replayed.

In the state where magazine 1 is completely inserted in changer apparatus 2, selecting lever 36 of magazine 1 is fitted in supporting frame 167 of holder selector 164, opening protrusion 27 and closing protrusion 26 of inner body 12 of magazine 1 are respectively engaged with opening catching portion 182 and closing catching portion 177 of slider 171.

In order to perform playback of a CD, the CD loaded on one of holders 30 is selected through operation of the controlling mechanism that controls changer apparatus 2. If arm 82 of playback unit 56 is not at the position of the selected CD at that time, elevating motor M2 rotates in the forward or the reverse direction so that arm 82 of playback unit 56 ascends or descends to move to a position slightly lower than holder 30 that carries the selected CD. Together with this movement of arm 82, sliding plate 161 integrated with arm 82 through cylinder 211 moves vertically to a height such that supporting frame 167 of holder selector 164 that moves integrally with sliding plate 161 catches selecting lever 36 of holder 30 carrying the selected CD.

Thereafter, loading motor M4 is driven in the reverse direction, thereby initiating reverse rotation of shaft 201.

At the beginning of the reverse rotation of shaft 201, slider 171 moves counterclockwise along the curved edge of the magazine due to engagement of gear 202 of shaft 201 with gear portion 174 of slider 171, and inner body 12 of magazine 1 engaged with opening catching portion 182 of slider 171 descends in counterclockwise rotation together with the slider. At the same time, holders 30 and separators 31 located below holder 30 which is prevented from rotating due to engagement with supporting frame 167 of holder selector 164 descend while rotating counterclockwise together with inner body 12.

When shaft 201 has rotated by a specified angle, slider 171 reaches the opening position. At that time, gear 202 of shaft 201 becomes disengaged from gear portion 174 of slider 171, and disk portion 209 becomes caught in recess 175 of slider 171, thereby locking slider 171 at the opening position. Furthermore, opening detection piece 192 of slider 171 comes into contact with detection lever 196 of switch SW1 and causes switch SW1 to swing so that switch SW1 is turned on and detects that slider 171 has reach the opening position. Meanwhile, leaf spring 123 becomes caught in opening indentation 190 and holds slider 171 at the opening position.

As a result, a space is formed below holder 30 that carries the selected CD, permitting playback unit 56 to advance into this space.

Figure 11:
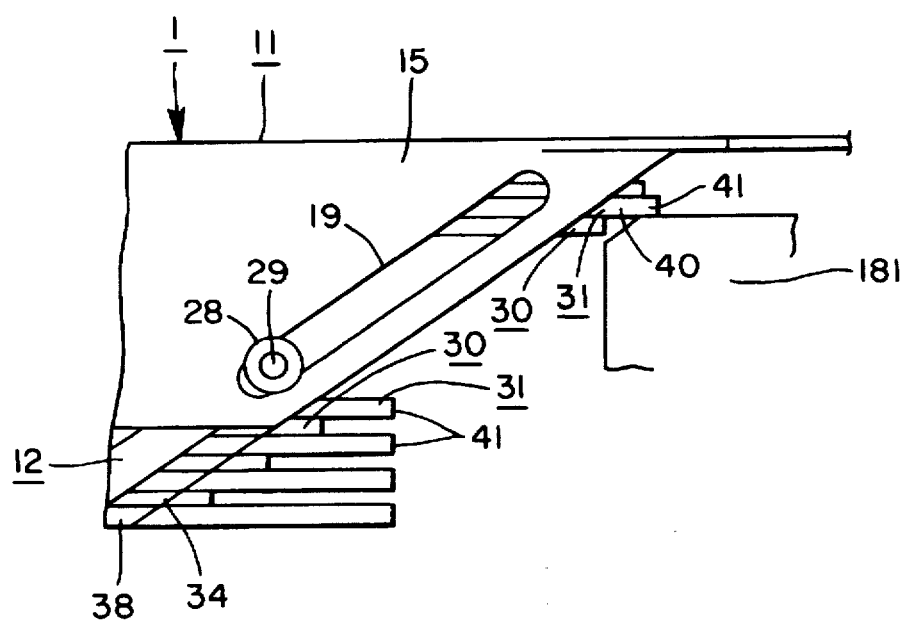
FIG. 11 illustrates the part of said changer apparatus when viewed from the direction indicated by arrow B of FIG. 3.

While lever portions 36 of holders 30 which have been lowered with respect to the position of selecting lever 36 of holder 30 held by holder selector 164 are lowered in counterclockwise rotation, opening levers 41 of lower separators 31 which have been lowered with respect to the position of opening lever 41 of separator 31 which is on holder 30 held by holder selector 164 are lowered in counterclockwise rotation. As shown in FIG. 11, separator selector 181 of slider 171 is located below opening lever 41 of separator 31 which is on holder 30 held by holder selector 164 so that said separator 31 is prevented from descending.

At the beginning of the reverse rotation of shaft 201, cam shaft 217 rotates counterclockwise as viewed in the drawings, and cutout portion 218 comes to face a rib 92 between stand-by indentation 93 and playback indentation 94 of base 81 of playback unit 56.

Then, during the middle stage of the reverse rotation of shaft 201, gear portion 210 of shaft 201 is interlocked with gear portion 95 of playback unit 56 so that arm 82 of playback unit 56 advances into the space formed in magazine 1 as it rotates clockwise as viewed in the drawings. At that time, as cutout portion 218 of cam shaft 217 faces rib 92 between stand-by indentation 93 and playback indentation 94 of base 81 of playback unit 56, arm 82 is released from its locked stand-by position and permitted to rotate.

When turntable 83 at the front end of arm 82 reaches the center of magazine 1, i.e. the playback position that corresponds to the center of the CDs, gear portion 210 of shaft 201 becomes disengaged from gear portion 95 of playback unit 56, and the wall of cam shaft 217 catches playback indentation 94 of base 81, thereby locking arm 82 at the playback position.

During the last stage of the reverse rotation of shaft 201, gear portion 213 of cylinder 211, which is fitted around shaft 201, catches rack gear 168 of holder selector 164, holder selector 164 moves down in counterclockwise rotation along slanted grooves 162 of sliding plate 161, and holder 30 whose selecting lever 36 is supported by supporting frame 167 of holder selector 164 also moves down while rotating counterclockwise. At that time, as holder 30 is provided with cutout portion 32, holder 30 moves without abutting against arm 82 of playback unit 56.

As a result, the CD loaded on the selected holder 30 moves down with the holder. During this downward movement, hole h of the CD fits around cap portion 123 of turntable 83, the CD thus rested on platform 122, and the reverse drive of loading motor M4 is terminated when holder 30 has been further lowered. At that time, as separator 31 located above the descending holder 30 and CD is prevented by separator selector 181 from descending, the selected CD is separated from both lower holder 30 and upper separator 31.

Next, CD is clamped on turntable 83. For this purpose, head 85 is moved to the innermost end in its moving range (the position where head 85 closest approaches turntable 83), and motor M1 is driven in the forward direction, thereby rotating turntable in the forward direction. As a result, catching portion 139 of setting/removing lever 136 rotating together with turntable 83 catches stopper 145 of head 85 so that cam plate 133, which is an integral body with setting/removing lever 136, stops. Therefore, turntable 83 alone continues to rotate, and, due to the constant force of spring 132, elevating plate 131 which has been released from the pushing force of cam portion 134 of cam plate 133 moves downward towards the clamping position shown in FIG. 1(c). Pushed by the descended elevating plate 131, clips 124 advance from cap portion 123, and supporting surface 129 of each clip 124 catches center hole h of the CD, thereby clamping it.

Then, head 85 is moved outward (towards the base end) after the clamping of the CD is completed. As a result, the CD rotates together with turntable, and head 85 moves to perform read-out and playback of signals recorded on the CD by means of laser pickup 141 of head 85.

When terminating playback of CD, the forward rotation of motor M1 is stopped, head 85 is moved to the innermost end in its moving range (the position where head 85 closest approaches turntable 83), and motor M1 is driven in the reverse direction for a specified period of time to rotate turntable 83 in the reverse direction. As a result, catching portion 139 of setting/removing lever 136 rotating together with turntable 83 catches stopper 145 of head 85 so that cam plate 133, which is an integral body with setting/removing lever 136, stops. Therefore, turntable 83 alone continues to rotate, and elevating plate 131 is moved upward by cam portion 134 of cam plate 133 to the unclamping position shown in FIG. 1(b). With clips 124 thus becoming free to advance or retreat, the CD is released from the clamping. Thereafter, head 85 is moved to the outermost end (the base end).

Then, loading motor M4 is driven in the forward direction so that shaft 201 begins to rotate in the forward direction.

In the beginning of the forward rotation of shaft 201, as gear portion 213 of cylinder 211 which is fitted around shaft 201 is engaged with rack gear 168 of holder selector 164, holder selector 164 ascends along slanted grooves 162 of sliding plate 161 while rotating clockwise along guide groove 96 of sliding plate 161, thereby permitting holder 30 whose selecting lever 36 is supported by supporting frame 167 of holder selector 164 to ascend while rotating clockwise.

During its ascend, holder 30 pushes up the CD that has been replayed, removes the CD from turntable 83, and moves on upward together with the CD thereon.

Then, when gear portion 213 of cylinder 211 becomes disengaged from rack gear 168 of holder selector 164, the wall of cylinder 211 comes into contact with rack gear 168, thereby holding holder selector 164 at its raised position.

Next, during the middle stage of the forward rotation of shaft 201, gear portion 210 of shaft 201 becomes engaged with gear portion 95 of playback unit 56, and arm 82 of playback unit 56 therefore rotates counterclockwise as viewed in the drawing and retreats from the space between the upper part and the lower part of magazine 1. At that time, as cutout portion 218 of cam shaft 217 faces rib 92 between stand-by indentation 93 and playback indentation 94 of base 81 of playback unit 56, arm 82 is released from its locked playback position and permitted to rotate.

When arm 82 reaches the initial stand-by position, gear portion 210 of shaft 201 becomes disengaged from gear portion 95 of playback unit 56, and the wall of cam shaft 217 becomes engaged in stand-by indentation 93 of base 81, locking arm 82 at the stand-by position.

Next, during the last stage of the forward rotation of shaft 201, disk portion 209 of shaft 201 becomes disengaged from recess 175 of slider 171 while gear portion 208 of shaft 201 catches gear portion 174 of slider 171, permitting slider 171 to move clockwise in the circumferential direction. As closing catching portion 177 of slider 171 pushes closing protrusion 26 of inner body 12 of magazine 1, inner body 12 moves upward while rotating clockwise together with the CDs, holders 30 and separators 31 which have been at their lowered positions. As a result, the space in magazine 1 is closed.

When slider 171 has returned to its initial closing position, the forward rotation of loading motor M4 is terminated, returning the apparatus to the initial stand-by mode. At that time, closing detection piece 191 of slider 171 comes into contact with detection lever 196 of switch SW1 and causes switch SW1 to swing so that switch SW1 is turned on and detects that slider 171 has reached the closing position. Meanwhile, leaf spring 193 becomes caught in closing indentation 189 and holds slider 171 at the closing position.

When changing CDs to be played, temporarily return playback unit 56 that is currently in the playback mode to the stand-by position, and also return magazine 1 to the stand-by state, where it is closed. Then, by means of driving elevating motor M2 in the forward or the reverse direction, adjust the positions of playback unit 56 and holder selector 164 to the height of holder 30 carrying the CD which is going to be played. Then, switch the mode of the apparatus from the stand-by mode to the playback mode to play the selected CD.

Further, by pushing ejection lever 72 in the stand-by mode, magazine 1 can be ejected from changer apparatus 2.

As described above, by means of moving any one of a plurality of CDs loaded in a stack in the direction in which the disks are stacked, forming a space which faces the CD to be played and inserting playback unit 56 into this space, it is possible to rotate and perform read out of the CD by using playback unit 56 while the CD is still in the stack. Thus, the present invention is capable of reducing the size of changer apparatus 2.

Furthermore, as magazine 1 can be opened and closed in such a manner that outer body 11 and inner body 12 are rotated in opposing directions parallel to the circumference of the disk to be moved apart or together in the direction in which the disks are stacked, while being always connected by a connection supporting means which is comprised of a sliding member 28, a screw 29 and the like provided at a side of magazine 1 where outer body 11 and inner body 12 overlap each other, the present invention ensures, with a simple configuration, stable opening and closing of outer body 11 and inner body 12 and is capable of increasing a number of read/write disks to be contained in the magazine within a specified vertical dimension.

Therefore, in cases where an apparatus according to the invention is used as a multiple-disk CD changer—for example a six-disk CD changer—for an automobile, it is possible to integrate a changer apparatus 2 into the center of the instrument panel.

Furthermore, as magazine is locked by locking member 45 in the state where outer body 11 and inner body 12 are closed together, there is no danger of outer body 11 and inner body 12 accidentally opening apart when magazine 1 is handled. Therefore, the invention ensures reliable setting and removal of magazine 1 in and from changer apparatus 2 with magazine 1 snugly closed.

A pinion gear 68 to be engaged with fixed rack gear 66 and exposed to constant force of spring 71 in the magazine ejecting direction is disposed at each inner side of magazine setting portion so that magazine 1 is inserted with its rack gears 42 engaged with respective pinion gears 68. The distance to be traveled by each pinion gear 68 while revolving is only about a half of the distance traveled by magazine 1. Therefore, the configuration of the invention is capable of reducing the size of the sides of ejecting unit 55 extending parallel to the direction in which the magazine is inserted or removed while ensuring the sufficient distance to eject magazine 1. As insertion and ejection of magazine 1 can be performed smoothly, the embodiment also ensures confortable and pleasing operation.

Furthermore, should magazine 1 be going to be ejected in the state where inner body 12 is not completely enclosed, the bottom of inner body 12 abuts against guide plate 51c, and the slanted surface of guide plate 51 guides inner body 12 upward. The invention thus ensures that inner body 12 be completely enclosed in outer body 11 when the magazine is ejected.

When a CD is set on turntable 83, by bringing head 85 close to turntable 83 and rotating the turntable in the forward direction, catching portion 139 of setting/removing lever 136 of turntable 83 is caused to catch stopper 145 of head 85 so that clips 124 advance from cap portion 123 of turntable 83. On the other hand, when a CD is removed from turntable 83, by bringing head 85 close to turntable 83 and rotating the turntable in the reverse direction, catching portion 139 of setting/removing lever 136 of turntable 83 is caused to catch stopper 145 of head 85 so that clips 124 become capable of retreating from cap portion 123 of turntable 83. Thus, without the need of a particular external force, a setting and/or removal of a CD can be performed in the limited space of changer apparatus 2.

In the configuration of playback unit 56 according to the present embodiment, arm 82 is supported by base 81, which is attached through threaded shaft 151 to case 51, wherein arm 82 is supported through bush 107 of connecting means 105 and also through spring 112 of adjusting means 106. Therefore, in spite of the overhang mounting where arm 82 is supported only at the base end, influence of external vibration to arm 82, i.e. vibration transmitted from case 51 to arm 82, is reduced. As a result, improper play is prevented.

It is to be noted that read/write disks mentioned in the above explanation include readonly disks and disks which can be used for both data reading and writing. In other words, record reproduction disks referred to herein are not limited to compact disks but also include video disks, read/write magneto-optical disks, magnetic disks and the like, and the present invention is applicable to all and any type of apparatus which performs reading and/or writing of these read/write disks.

In case of a read/write apparatus for reading and writing data from and onto magnetic disks, a magnetic read/write head for reading and writing magnetic data from and onto a magnetic disk is used as playback unit 56.

Although magazine 1 of the embodiment explained above has an inner body 12 fitted in outer body 11, this inside-outside combination between bodies 11 and 12 may be the other way around without departing from the scope or the spirit of the invention as defined in the appended claims. Furthermore, in cases where outer body 11 is rotated to open or close magazine 1, outer body 11 may be provided with a closing protrusion 26 and/or an opening protrusion 27.

In the configuration of a read/write apparatus for reading and/or writing a read/write disk according to the present invention. When a read/write disk is set on the turntable, by bringing the head close to the turntable and rotating the turntable in one direction, a catching portion of a setting/removing lever of the turntable is caused to catch a stopper of the head so that clips advance from the cap portion of the turntable and hold the read/write disk. When a read/write disk is removed from the turntable, by bringing the head close to the turntable and rotating the turntable in the other direction, the catching portion of the setting/removing lever of the turntable is caused to catch the stopper of the head so that the clips become capable of retreating from the cap portion of the turntable. Thus, according to the invention, a setting and/or removal of a read/write disk can be performed in the limited space of a read/write apparatus without the need of a particular external force.

What is claimed is:

1. A read/write apparatus comprising:

a turntable having a cap portion onto which a center hole of a read/write disks fitted thereto and removed therefrom;

a turntable driving system for rotating the turntable in a forward and a reverse direction;

a plurality of clips, wherein the clips advance and retreat from a circumference of the cap portion, such that when the clips are at their respective advanced positions, the clips contact a rim of the center hole of the read/write disk and hold the read/write disk against the turntable;

a fitting/removing lever mounted for rotating by a specified angle with respect the turntable, the fitting/removing lever having a catching portion protruding from a rim of the turntable;

a head for moving in a radial direction of the read/write disk for performing reading and writing of the read/write disk, the head having a stopper for catching the catching portion of the fitting/removing lever at a position where the head is in closest proximity with the turntable; and a fitting/removing device wherein rotation of the turntable in one direction engages the catching portion of the fitting/removing lever with the stopper of the head causing the clips to advance, and rotation of the turntable in an opposite direction engages the catching portion of the fitting/removing lever with the stopper of the head causing the clips to retreat.

* * * * *

UNITED STATES PATENT AND TRADEMARK OFFICE
CERTIFICATE OF CORRECTION

PATENT NO. : 5,761,185
DATED : June 2, 1998
INVENTOR(S) : Hideo Horiguchi, Hiroshi Kimura It is certified that error appears in the above-indentified patent and that said Letters Patent is hereby corrected as shown below:

In Column 18, Line 5, the word "disks" should be "disk"

In Column 18, Line 5, the word "is" should be inserted before the word "fitted".

Signed and Sealed this

Eleventh Day of August 1998

Attest:

BRUCE LEHMAN

*Attesting Officer*  *Commissioner of Patents and Trademarks*